United States Patent
Nakata (10) Patent No.: US 9,125,069 B2
(45) Date of Patent: Sep. 1, 2015

(54) RADIO COMMUNICATION SYSTEM, RADIO BASE STATION, RADIO COMMUNICATION TERMINAL, RADIO COMMUNICATION METHOD, AND A NON-TRANSITORY COMPUTER READABLE MEDIUM EMBODYING INSTRUCTIONS FOR CONTROLLING A DEVICE TO IMPLEMENT A CONTROL METHOD

(71) Applicant: NEC Corporation, Tokyo (JP)

(72) Inventor: Atsushi Nakata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 177 days.

(21) Appl. No.: 13/749,045

(22) Filed: Jan. 24, 2013

(65) Prior Publication Data

US 2013/0189999 A1 Jul. 25, 2013

(30) Foreign Application Priority Data

Jan. 24, 2012 (JP) .................................. 2012-012199

(51) Int. Cl.
*H04W 40/00* (2009.01)
*H04W 16/24* (2009.01)
(Continued)

(52) U.S. Cl.
CPC .............. *H04W 16/24* (2013.01); *H04W 16/32* (2013.01); *H04W 24/10* (2013.01)

(58) Field of Classification Search
CPC ..... H04W 16/24; H04W 16/32; H04W 24/10; H04W 24/04; H04W 24/02; H04W 16/18; H04W 16/28; H04W 16/30; H04W 24/08; H04W 72/082; H04W 72/12; H04W 36/0072; H04W 36/30; H04W 36/36
USPC ........... 455/446, 449, 422.1, 452.1, 438, 522, 455/561
See application file for complete search history.

(56) References Cited

U.S. PATENT DOCUMENTS 5,487,174 A * 1/1996 Persson .......................... 455/444
7,162,203 B1 * 1/2007 Brunner ....................... 455/63.1
(Continued)

FOREIGN PATENT DOCUMENTS

JP 2006-135673 A 5/2006
JP 2009-290459 A 12/2009
(Continued)

OTHER PUBLICATIONS

"3rd Generation Partnership Project; Technical Specification Group Radio Access Networks; Home Node B Radio Frequency (RF) Requirements (FDD) (release 9)", 3GPP TR 25.967 9.0.0, May 2009, pp. 1-55.

(Continued)

*Primary Examiner* — Khai M Nguyen
(74) *Attorney, Agent, or Firm* — Sughrue Mion, PLLC (57) ABSTRACT

When one base station forms a plurality of cells that use different frequency bands, a handover caused by movement between cells can be successfully performed with a high probability. A radio base station adapted to communicate with a radio communication terminal, comprising: a communication unit which performs a first communication with the radio communication terminal by using a first frequency, wherein the communication unit performs a second communication with the communication terminal by using a second frequency that is different from the first frequency; and a controller which performs a control, of at least one of a first power of the first communication and a second power of the second communication, based on a first power-related quality of the first communication and a second power-related quality of the second communication.

7 Claims, 8 Drawing Sheets

(51) Int. Cl.
*H04W 16/32* (2009.01)
*H04W 24/10* (2009.01)

(56) References Cited

U.S. PATENT DOCUMENTS

| | | | |
|---|---|---|---|
| 7,756,523 B2* | 7/2010 | Ebata | 455/453 |
| 2004/0131029 A1* | 7/2004 | Tobe et al. | 370/331 |
| 2008/0144528 A1* | 6/2008 | Graves et al. | 370/254 |
| 2010/0112998 A1* | 5/2010 | Choudhury et al. | 455/422.1 |
| 2010/0317352 A1* | 12/2010 | Nakata | 455/445 |
| 2011/0026441 A1* | 2/2011 | Diener et al. | 370/260 |
| 2011/0194455 A1* | 8/2011 | Aminaka et al. | 370/252 |
| 2012/0046025 A1* | 2/2012 | Das et al. | 455/422.1 |

FOREIGN PATENT DOCUMENTS

| | | |
|---|---|---|
| JP | 2011234028 A | 11/2011 |
| WO | 2008136415 A1 | 11/2008 |
| WO | 2010061504 A1 | 6/2010 |
| WO | 2010128576 A1 | 11/2010 |

OTHER PUBLICATIONS

International Search Report, dated Mar. 19, 2013, issued by the International Searching Authority in counterpart International Application No. PCT/JP2013/051688.

Written Opinion, dated Mar. 19, 2013, issued by the International Searching Authority in counterpart International Application No. PCT/JP2013/051688.

* cited by examiner

RADIO COMMUNICATION SYSTEM, RADIO BASE STATION, RADIO COMMUNICATION TERMINAL, RADIO COMMUNICATION METHOD, AND A NON-TRANSITORY COMPUTER READABLE MEDIUM EMBODYING INSTRUCTIONS FOR CONTROLLING A DEVICE TO IMPLEMENT A CONTROL METHOD

INCORPORATION BY REFERENCE

This application is based upon and claims the benefit of priority from Japanese patent application No. 2012-012199, filed on Jan. 24, 2012, the disclosure of which is incorporated herein in its entirety by reference.

BACKGROUND

An exemplary embodiment relates to a radio communication system, a radio base station, a radio communication terminal, and a radio communication method.

In recent radio communication systems, small base stations called femto base stations may be newly introduced in addition to existing base stations, to provide femto cell services. Hereinafter, an existing base station is referred to as a macro base station for the sake of differentiation. Further, in the period of generation changes in radio communication systems, it is expected to provide dual-mode base stations or dual-mode mobile stations corresponding to two old and new radio communication systems, and various apparatuses have been proposed (Japanese Unexamined Patent Application Publication No. 2009-290459 (Nakata)). For example, when femto base stations are developed at the timing of the introduction of an LTE (Long Term Evolution) system, interconnectivity to an existing 3G (3rd Generation) system becomes important, and a femto cell base station forming both cells of the LTE system and the 3G system are required.

Incidentally, the radio communication system typically supports a circuit switching call (CS Call) represented by a voice call and a packet switching call (PS Call). However, since LTE systems at an early stage of introduction cannot address with a VoIP over LTE (VoIP: Voice over Internet Protocol) function that is required for the CS Call, when a dual-mode radio communication terminal using the LTE system makes or receives the CS Call, a CS Fallback function is often supported to forcibly move the terminal from the LTE cell to the 3G cell by a handover. Further, in this case, a function of performing a handover of the radio communication terminal is often supported as well in order to return the terminal from the 3G cell to the LTE cell where higher-speed communication can be achieved when the radio communication terminal ends the CS Call.

Meanwhile, when one base station forms the cell of the LTE system and the cell of the 3G system, coverage areas of the both cells are not normally matched with each other. One reason for this is that both systems use different frequency bands from each other. Even when radio parameters are initially tuned to make the coverage areas of both systems match with each other at the stage of the cell design, there is generated a difference in coverage areas of both systems since the number of users in each cell and radio interference from neighbor cells are different for each system. In particular, in the case of the femto cell, transmission power of a femto base station is adjusted according to propagation loss from the nearest macro base station (Home Node B Radio Frequency (RF) Requirements (FDD) [3GPP TR25.967 v9.0.0]). The location at which the macro base station of the LTE system is installed and the location at which the macro base station of the 3G system is installed are not necessarily the same but are normally different. As a result, the coverage area of the cell of the LTE system and the coverage area of the cell of the 3G system formed by one base station are different.

In general, since it is necessary to perform complicated cell system designing/evaluation work in order to form the service area of the radio communication system, various cell forming methods have been studied. For example, Japanese Unexamined Patent Application Publication No. 2006-135673 (Mori et al.) discloses a mobile communication system that autonomously sets transmission power of a common control channel to form a cell while cooperating with surrounding base stations.

The related arts described above have the following problems.

When a handover caused by movement between cells is performed between cells having different coverage areas, the handover may be ended in failure in some cases. For example, take an example in which the coverage area of the source cell is wider than the coverage area of the destination cell. In this case, when a handover is performed on a radio communication terminal which is in the service area in the source cell but in the outside of the service area in the destination cell, it is expected that communication is not normally performed in the destination cell, which results in failure in the handover. In another case in which a femto base station is used, when a radio communication terminal is located at a position which is outside the service area in a femto cell which is a destination candidate but within the service area in a surrounding macro cell, the radio communication terminal is handed over not to the candidate cell to which the own femto base station was originally intended to move but to a surrounding macro cell, although the handover itself is not unsuccessful. This prevents a user from receiving the benefits of inexpensive communication costs and significant improvement in communication data rate since only a limited number of users are able to use radio resources exclusively. These benefits are something that the user could have received by continuous use of the femto cell, not using the macro cell.

Accordingly, when one base station forms a plurality of cells that use different frequency bands, in order to successfully perform a handover caused by movement between cells with a high probability, it is required to appropriately control coverage areas of the plurality of cells.

The cell forming method disclosed by Mori et al. is a method of forming a cell of an own base station in cooperation with surrounding base stations, and cannot be applied to a case in which it is required to control coverage areas of a plurality of cells that use different frequency bands when one base station forms the plurality of cells.

SUMMARY

One exemplary object of the exemplary embodiment is to provide a radio communication system that is able to control coverage areas of a plurality of cells that use different frequency bands when one base station forms the plurality of cells.

However, an illustrative embodiment may achieve objectives other than those described above. Further, illustrative embodiments are not required to achieve the objectives described above, and an illustrative embodiment may not achieve any of the objectives described above.

A radio communication base station according to one exemplary aspect of the exemplary embodiment is a radio base station, adapted to communicate with a radio communication terminal, comprising: a communication unit which performs a first communication with the radio communication terminal by using a first frequency, wherein the communication unit performs a second communication with the communication terminal by using a second frequency that is different from the first frequency; and a controller which performs a control, of at least one of a first power of the first communication and a second power of the second communication, based on a first power-related quality of the first communication and a second power-related quality of the second communication.

A radio communication base station according to one exemplary aspect of the exemplary embodiment is a radio base station, adapted to communicate with a radio communication terminal, comprising: a communication unit which performs a first communication with the radio communication terminal in a first cell, wherein the communication unit performs a second communication with the communication terminal in a second cell that is different from the first cell; and a controller which controls a size of a coverage area, of at least one of a first cell and second cell, based on a first quality of the first communication and a second quality of the second communication.

A control method for a radio base station according to another exemplary aspect of the exemplary embodiment is a control method for a radio base station, adapted to communicate with a radio communication terminal, comprising: performing a first communication with the radio communication terminal by using a first frequency; performing a second communication with the communication terminal by using a second frequency that is different from the first frequency; and performing a control, of at least one of a first power of the first communication and a second power of the second communication, based on a first power-related quality of the first communication and a second power-related quality of the second communication.

A non-transitory computer readable medium embodying instructions according to another exemplary aspect of the exemplary embodiment for controlling a device to implement a control method for a radio base station is a non-transitory computer readable medium embodying instructions for controlling a device to implement a control method for a radio base station, adapted to communicate with a radio communication terminal, comprising: performing a first communication with the radio communication terminal by using a first frequency; performing a second communication with the communication terminal by using a second frequency that is different from the first frequency; and performing a control, of at least one of a first power of the first communication and a second power of the second communication, based on a first power-related quality of the first communication and a second power-related quality of the second communication.

A radio communication system according to another exemplary aspect of the exemplary embodiment is a radio base station, adapted to communicate with a radio communication terminal, comprising: a communication unit which receives an first signal by using a first frequency, wherein the communication unit transmits an second signal by using a second frequency that is different from the first frequency; and a controller which performs a control, of at least one of a first power of the first signal and a second power of the second signal, based on a first power-related quality of the first signal and a second power-related quality of the second signal.

A radio communication system according to another exemplary aspect of the exemplary embodiment is a radio base station, adapted to communicate with a radio communication terminal, comprising: a communication unit which performs a first communication with the radio communication terminal, wherein the communication unit performs a second communication with the communication terminal; and a controller which performs a control, of at least one of a first power of the first communication and a second power of the second communication, based on a first power-related quality of the first communication and a second power-related quality of the second communication.

The above and other objects, features and advantages of the present invention will become more fully understood from the detailed description given hereinbelow and the accompanying drawings which are given by way of illustration only, and thus are not to be considered as limiting the present invention.

DETAILED DESCRIPTION OF EXEMPLARY EMBODIMENT

Hereinafter, with reference to the drawings, exemplary embodiments to achieve the present invention will be described.

(1) First Exemplary Embodiment

Figure 1:
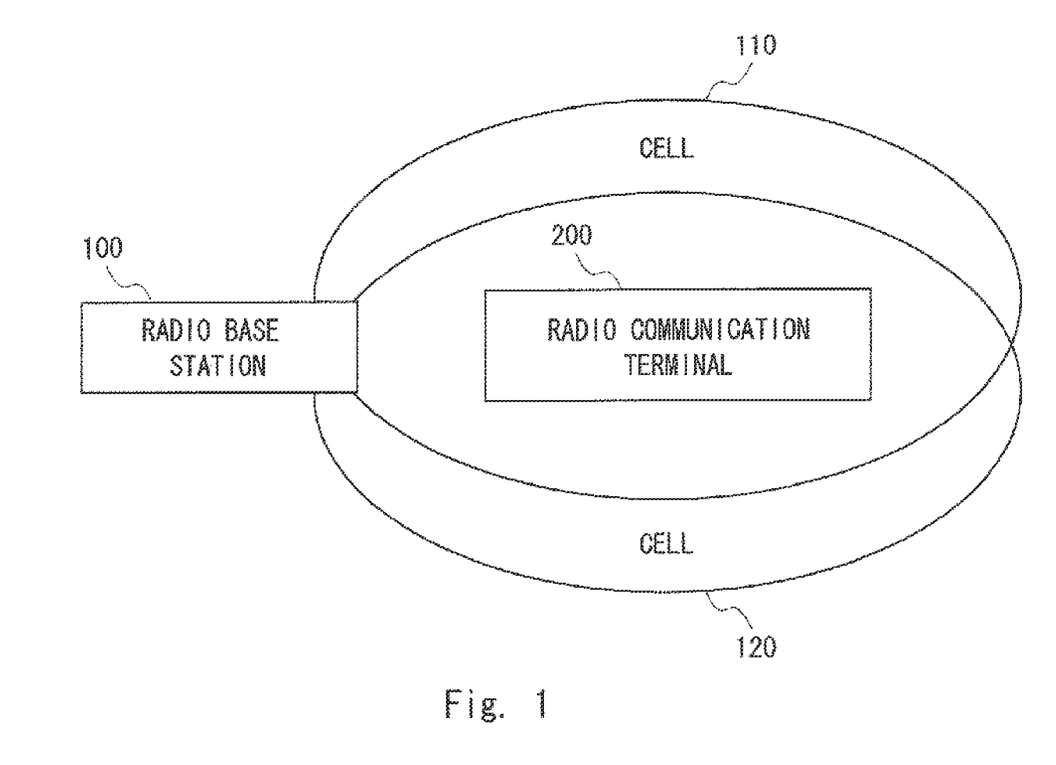
FIG. 1 is a diagram showing a schematic configuration of a radio communication system according to a first exemplary embodiment of the present invention.

FIG. 1 shows a schematic configuration of a radio communication system according to a first exemplary embodiment of the present invention. Referring to FIG. 1, the radio communication system according to this exemplary embodiment includes a radio base station 100 forming a cell 110 and a cell 120 that use different frequency bands with each other, and a radio communication terminal 200.

The radio base station 100 controls transmission power, so as to be able to control coverage areas of the cell 110 and the cell 120. Further, the radio base station 100 is able to instruct the radio communication terminal 200 to measure quality of radio communication between the radio base station 100 and the radio communication terminal 200. Further, the radio base station 100 is able to receive the results of measuring the quality of the radio communication from the radio communication terminal 200.

The radio communication terminal 200 may camp on either the cell 110 or the cell 120, and is able to communicate with the base station 100 in either cell. Further, the radio communication terminal 200 is able to measure the quality of the radio communication between the radio base station 100 and the radio communication terminal 200 according to the instruction from the radio base station 100 to transmit the measurement results to the radio base station 100.

Figure 2:
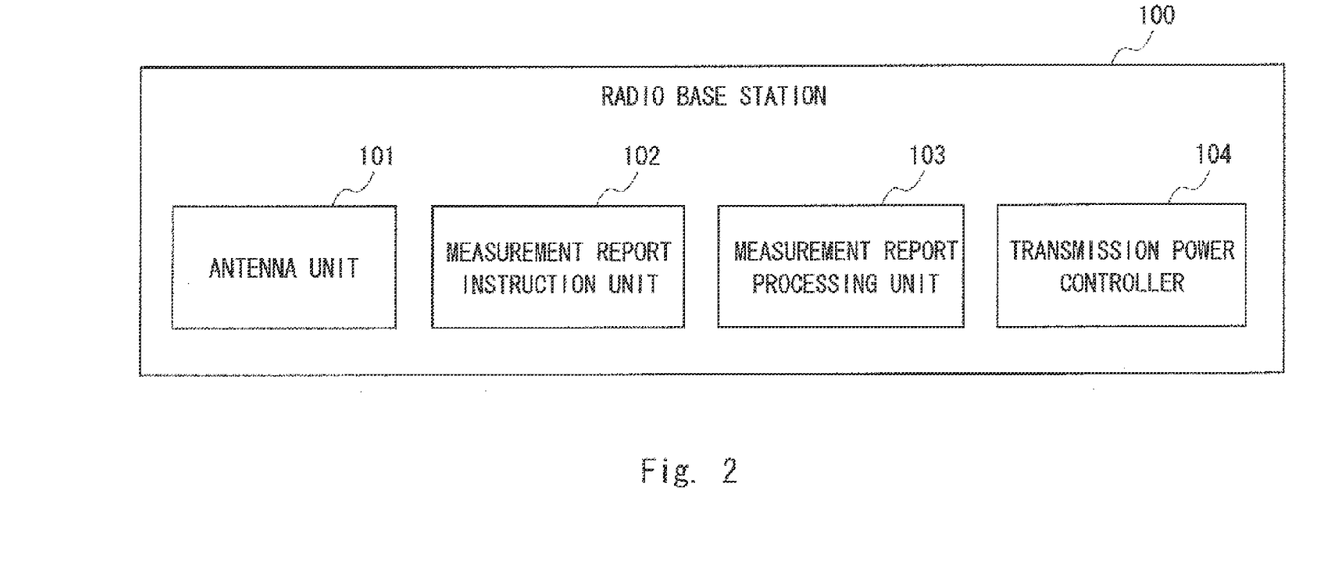
FIG. 2 is a block diagram showing a schematic configuration of a radio base station according to the first exemplary embodiment of the present invention.

FIG. 2 is a block diagram showing a schematic configuration of the radio base station 100. Referring to FIG. 2, the radio base station 100 according to this exemplary embodiment includes an antenna unit 101, a measurement report instruction unit 102, a measurement report processing unit 103, and a transmission power controller 104.

The antenna unit 101 transmits or receives radio waves to communicate with the radio communication terminal 200.

The measurement report instruction unit 102 instructs the radio communication terminal 200 to measure the quality of the radio communication between the radio base station 100 and the radio communication terminal 200 and to report the measurement results. The instruction is transmitted to the radio communication terminal 200 by way of the antenna unit 101 as a message. The message may be separately transmitted by the radio base station 100 to the radio communication terminal 200, or may be a message of system information broadcasted by the radio base station 100 to the cell 110 and the cell 120.

The measurement report processing unit 103 receives a message to report the results of measuring the quality of the radio communication received from the radio communication terminal 200 by way of the antenna unit 101.

The transmission power controller 104 controls transmission power of radio waves transmitted from the antenna unit 101 based on the results of measuring the quality of the radio communication processed by the measurement report processing unit 103.

Figure 3:
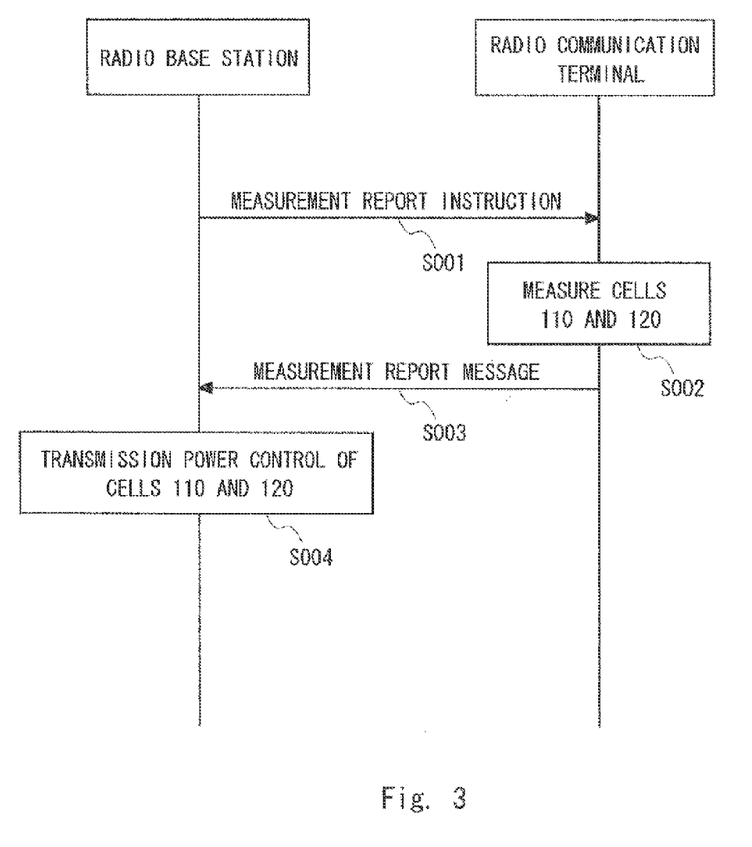
FIG. 3 is a sequence diagram showing an operation of the radio communication system according to the first exemplary embodiment of the present invention.

FIG. 3 is a sequence diagram showing an operation of the radio communication system according to this exemplary embodiment. Hereinafter, with reference to FIG. 3, an operation of the radio communication system according to this exemplary embodiment will be described.

In S001, the radio base station 100 instructs the radio communication terminal 200 to measure and report the quality of the radio communication between the radio base station 100 and the radio communication terminal 200 in the cell 110 and the cell 120.

Examples of the quality of the radio communication include reception power in the radio communication terminal 200. Further, examples of the quality of the radio communication in the case of cells in the LTE system include RSRP (Reference Signal Received Power), RSRQ (Reference Signal Received Quality), and Pathloss. Examples of the quality of the radio communication in the case of cells in the 3G system include P-CIPCH (Primary Common Pilot Channel) Ec/No (The received energy per chip divided by the power density in the band.), P-CIPCH (Primary Common Pilot Channel) RSCP (Received Signal Code Power), and Pathloss.

The radio base station 100 may include a measurement/report condition, a measurement/report target and the like in the instruction. For example, the measurement/report may be performed when the result of measuring the reception power in the cell 110 or the cell 120 does not satisfy a predetermined condition.

In S002, the radio communication terminal 200 measures the quality of the radio communication between the radio base station 100 and the radio communication terminal 200 in the cell 110 and the cell 120 according to the measurement condition instructed by the radio base station 100.

In S003, the radio communication terminal 200 transmits the message reporting the measurement results to the radio base station 100 according to the report condition instructed by the radio base station 100.

In S004, the radio base station 100 performs transmission power control in the cell 110 and the cell 120 based on the measurement results that are received.

While the radio communication terminal 200 reports the measurement results using the measurement report message in Step S003 in FIG. 3, the radio communication terminal 200 may report the measurement results to the radio base station 100 with positional information using a Logged MDT (Minimizing Drive Test).

Figure 4:
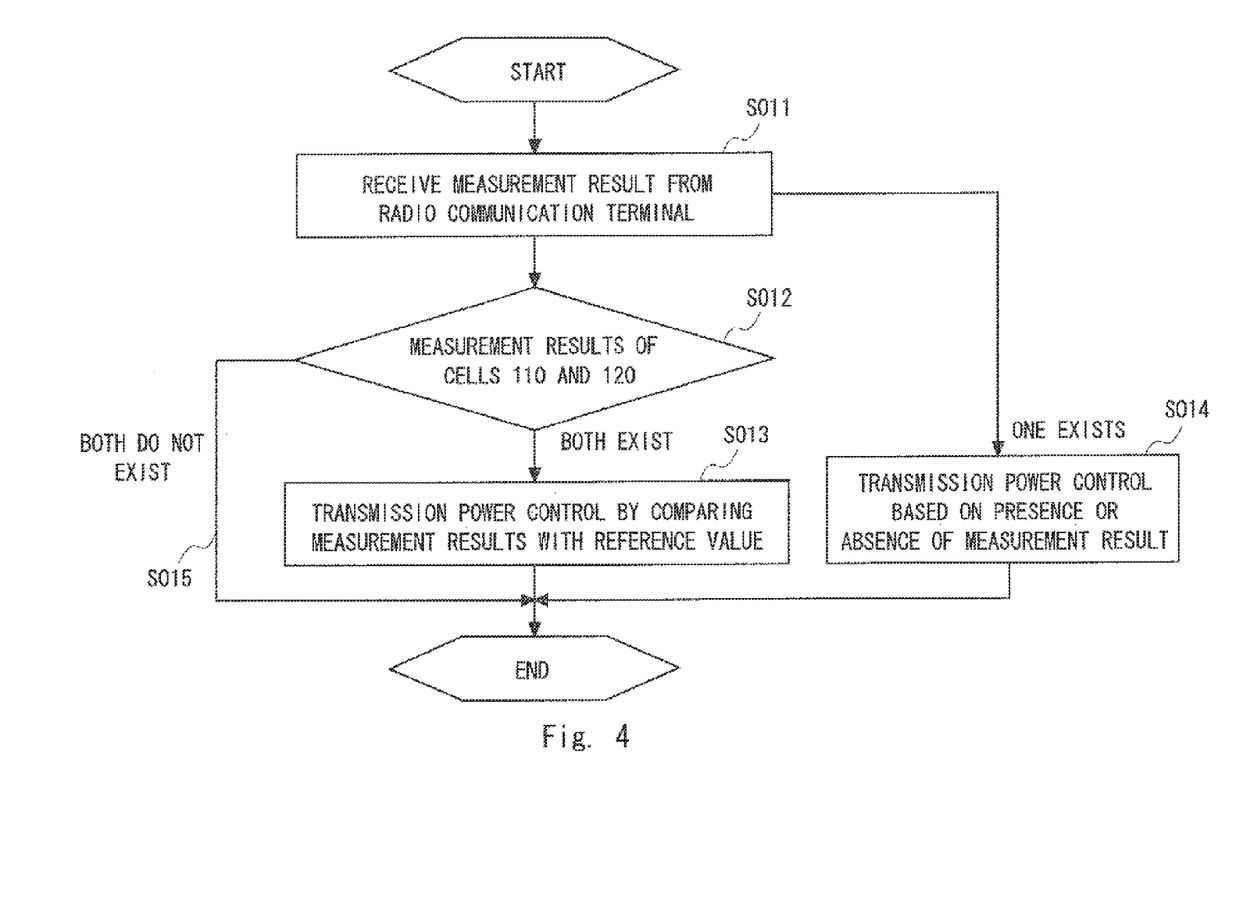
FIG. 4 is a flowchart showing an operation of the radio base station according to the first exemplary embodiment of the present invention.

FIG. 4 is a flowchart showing one example of an operation of the radio base station 100 according to this exemplary embodiment. Hereinafter, with reference to FIG. 4, an operation of the radio base station 100 when cell coverage areas of the cell 110 and the cell 120 are substantially matched will be described.

In S011, the radio base station 100 receives the results of measuring the quality of the radio communication from the radio communication terminal 200.

In S012, the radio base station 100 determines whether the measurement results that are received include measurement results in both of the cell 110 and the cell 120.

In S013, when there are both measurement results, the radio base station 100 compares the measurement result in the cell 110 with respect to a predetermined reference value of the cell 110 (a first predetermined reference value). The radio base station 100 compares the measurement result in the cell 120 with respect to a predetermined reference value of the cell 120 (a second predetermined reference value). Then the radio base station 100 compares a relative value A of the measurement result in the cell 110 with a relative value B of the measurement result in the cell 120. When A is larger than B as a result of the comparison, the radio base station 100 performs such a control as to reduce the transmission power in the cell 110 by a predetermined control width and to increase the transmission power in the cell 120 by a predetermined control width. On the contrary, when B is larger than A, the radio base station 100 performs such a control as to increase the transmission power in the cell 110 by a predetermined control width, and to reduce the transmission power in the cell 120 by a predetermined control width. When A is equal to B, the radio base station 100 performs such a control as to maintain the transmission power in the cell 110 and the cell 120.

When there is a measurement result of only one of the cells, in S014, the radio base station 100 performs such a control as to reduce the transmission power in the cell with measurement result by a predetermined control width, and to increase the transmission power in the cell without measurement result by a predetermined control width.

When there are no measurement results in both cells, in S015, the radio base station 100 performs such a control as to maintain the transmission power in both cells.

As stated above, according to this exemplary embodiment, a radio base station forming the plurality of cells that use different frequency bands is able to control the transmission power so that coverage areas of the plurality of cells form desired areas. Further, a control is made so that the coverage areas of the plurality of cells are substantially matched. Accordingly, when a handover is caused by the radio communication terminal moving between cells, even when the radio communication terminal exists at an end of a cell, there is a high possibility that the handover caused by the movement between cells is successfully performed. Further, one radio base station is able to continue controlling the radio communication terminal. Thus, compared to a case in which a handover across a plurality of different radio base stations is performed, there occurs no instantaneous interruption when the radio communication terminal downloads or uploads data, which improves the throughput of the communication. Since one radio base station continues controlling the radio communication terminal, there are other advantages that it is possible to provide Local Network Service, to allow a user to receive the benefit of low charge because of the continuous use of the femto cell, and to achieve traffic offload and improvement in the system throughput of a macro cell system due to the radio communication terminal not using the macro cell system.

(2) Second Exemplary Embodiment

A condition to perform the transmission power control may be added to the first exemplary embodiment. More specifically, in a second exemplary embodiment, the radio base station 100 performs the transmission power control only when the result obtained by comparing the result of measuring the quality of the radio communication in the cell 110 with a predetermined threshold of the cell 110 and the cell 120 with a predetermined threshold of the cell 120 in S013 of FIG. 4 satisfies a predetermined condition. More specifically, for example, when the results of measuring the reception power by the radio communication terminal 100 is smaller than a predetermined thresholds, it is assumed that the radio communication terminal 100 is at an end of a cell and the transmission power control is performed. On the contrary, when the result of measuring the reception power is equal to or larger than the predetermined thresholds, it is assumed that the radio communication terminal 100 is at a location such as the center of a cell which provides high radio communication quality and the transmission power control is not performed. This is because, the handover caused by the movement between cells is expected to be successful in many cases when the radio communication terminal 100 is at the center of the cell, whereas the handover is expected to be unsuccessful in many cases when the radio communication terminal 100 is at an end of a cell.

Figure 5:
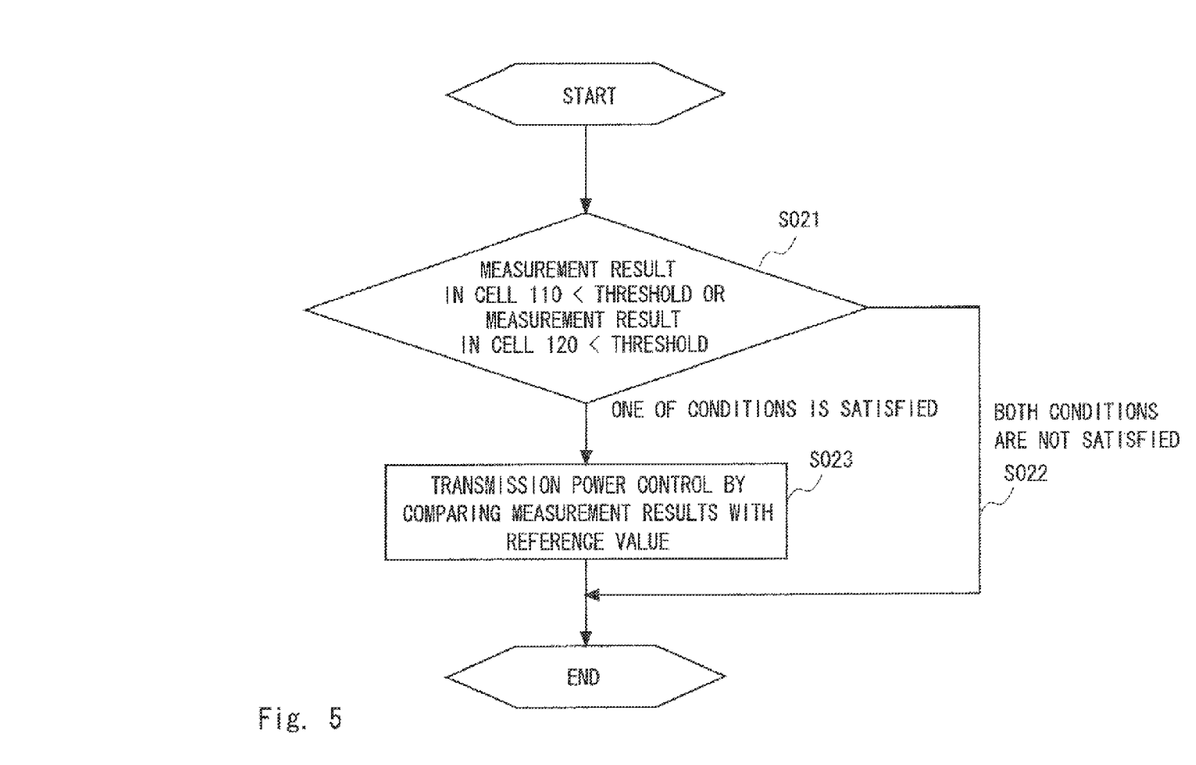
FIG. 5 is a flowchart showing an operation of a radio base station according to a second exemplary embodiment of the present invention.

FIG. 5 is a flowchart showing an operation of the radio base station 100 according to this exemplary embodiment.

In Step S021, the radio base station 100 compares the result of measuring the quality of the radio communication in each of the cell 110 and the cell 120 with each threshold, to determine whether the predetermined condition is satisfied.

In Step 022, when the measurement result in the cell 110 is equal to or larger than the predetermined threshold of the cell 110 and the measurement result in the cell 120 is equal to or larger than the predetermined threshold of the cell 120, the radio base station 100 does not perform the transmission power control.

In Step 023, the radio base station 100 performs the transmission power control when the measurement result in the cell 110 is smaller than the predetermined threshold of the cell 110 or the measurement result in the cell 120 is smaller than the predetermined threshold of the cell 120. The thresholds may be a predetermined absolute value, or may be a relative value that is determined according to interference power from neighbor cells. Further, the thresholds may be set by an operation or may be set according to interference power from neighbor cells.

In this way, according to this exemplary embodiment, it is possible to perform the transmission power control only based on the measurement results of the radio communication terminal that is located at an end of a cell, whereby it is possible to perform the transmission power control with high accuracy using a smaller amount of processing.

By appropriately specifying the measurement/report condition from the radio base station 100 to the radio communication terminal 200 in S001 of FIG. 3, the same effects as the case of performing the operation in FIG. 5 stated above can be obtained. Specifically, such a condition is set that, the radio base station 100 notifies the radio communication terminal 200 of predetermined thresholds, and the measurement results are reported only when the result obtained by comparing the result of measuring the quality of the radio communication with the thresholds satisfies a predetermined condition. Then, only the radio communication terminal 200 that satisfies the predetermined condition located at an end of a cell transmits the measurement results to the radio base station 100, and the radio base station 100 performs the transmission power control based on the measurement result.

As stated above, according to this exemplary embodiment, only the radio communication terminal that is located at an end of a cell transmits the message to report the measurement results. Thus, it is possible to reduce the number of messages, the processing load in the radio base station, and power consumption in the radio communication terminal.

In the exemplary embodiment described above, the radio communication terminal 200 that is located at an end of a cell is determined by comparing the result of measuring the quality of the radio communication with the threshold. However, when the latitude and the longitude of the location of the radio communication terminal 200 are known, it may be determined whether the radio communication terminal 200 is located at an end of a cell based on the latitude/longitude information. In this case, as one example, the radio base station 100 is able to cause the radio communication terminal 200 equipped with a GPS (Global Positioning System) to report the latitude/longitude information of the current location, and compares this information with ranges of predetermined latitude and longitude stored in advance that should be regarded as an end of a cell, thereby being able to determine whether the radio communication terminal 200 is located at an end of a cell. Alternatively, the radio base station 100 may determine whether the radio communication terminal 200 is located at an end of a cell by calculating the distance between the radio communication base station 100 and the radio communication terminal 200 from the latitude/longitude information of the radio base station 100 and the latitude/longitude information of the radio communication terminal 200 and comparing the distance with a predetermined thresholds. Further alternatively, it may be possible to use the latitude/longitude information when the radio communication terminal 100 moves between the cell 110 or the cell 120 and another cell, or the radio communication terminal 100 moves between the cell 110 and the cell 120 (Cell Reselection or handover) to determine whether the radio communication terminal 200 is located at an end of a cell. Further alternatively, the latitude/longitude information when the handover caused by the movement between cells is unsuccessful may be used to determine whether the radio communication terminal 200 is located at an end of a cell.

According to this exemplary embodiment, compared to the case in which it is determined whether the radio communication terminal is located at an end of a cell by the reception power measured by the radio communication terminal, it may be possible to make a determination with higher accuracy even in such a case in which the radio propagation environment varies depending on special circumstances.

In the transmission power control in S013 of FIG. 4 and S023 of FIG. 5, the control width of the transmission power control may be set to different values between a case in which a control is made so that the measurement result is away from the reference value and a case in which a control is made so that the measurement result is close to the reference value. More specifically, a case will be described as an example in which the result of measuring the reception power reported from the radio communication terminal 200 to the radio base station 100 is −50 (dB), the reference value is −60 (dB), and the value of the current transmission power is 20 (dBm). In this case, when a control is made so that the measurement result is away from the reference value, i.e., a control is made to increase the transmission power, the value is set to 20+ΔP1 (dBm). On the contrary, when a control is made so that the measurement result is close to the reference value, i.e., a control is made to decrease the transmission power, the value is set to 20−ΔP2 (dBm). It is possible to set ΔP1 and ΔP2 to different values so that ΔP1<ΔP2, for example.

As described above, in this exemplary embodiment, the control width of the transmission power control is adjusted to increase or decrease based on the result of comparing the measurement result with the reference value. In this way, it is possible to make an adjustment so that the measurement result does not substantially differ from the reference value.

(3) Third Exemplary Embodiment

Figure 6:
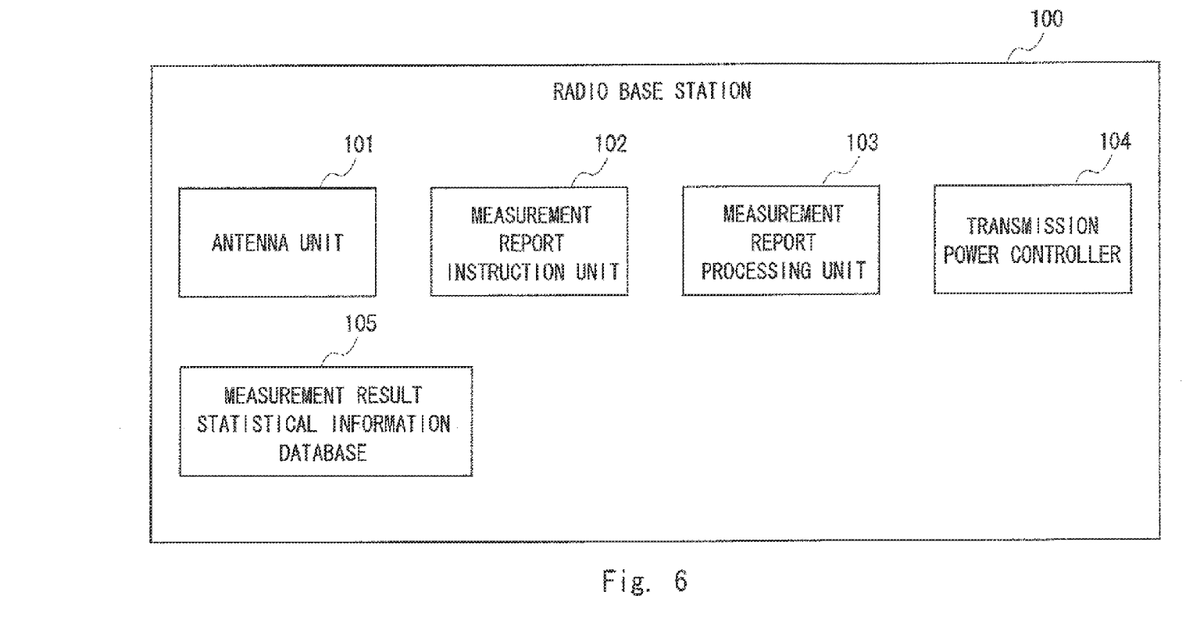
FIG. 6 is a block diagram showing a schematic configuration of a radio base station according to a third exemplary embodiment of the present invention.

FIG. 6 is a block diagram showing a schematic configuration of a radio base station 100 according to a third exemplary embodiment of the present invention. With reference to FIG. 6, the radio base station 100 includes, as is similar to the first exemplary embodiment shown in FIG. 2, an antenna unit 101, a measurement report instruction unit 102, a measurement report processing unit 103, and a transmission power controller 104. Since these components are the same to those in the first exemplary embodiment, the description thereof will be omitted. In FIG. 6, a measurement result statistical information database 105 is further included.

The measurement result statistical information database 105 is a database to store the results of measuring the quality of the radio communication received from the radio communication terminal 200 as statistical information.

Figure 7:
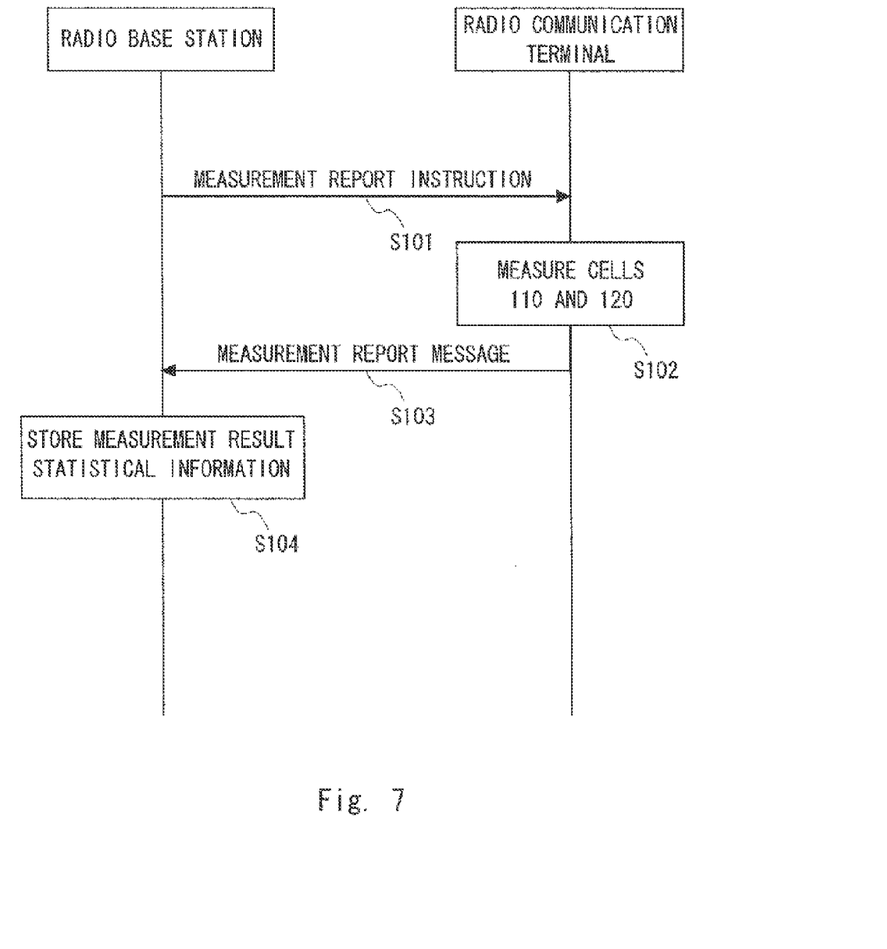
FIG. 7 is a sequence diagram showing an operation of a radio communication system according to the third exemplary embodiment of the present invention.

FIG. 7 is a sequence diagram showing an operation of a radio communication system according to this exemplary embodiment. Hereinafter, with reference to FIG. 7, an operation of the radio communication system according to this exemplary embodiment will be described.

Since the operations of the radio base station 100 in S101, S102, and S103 are similar to those of the first exemplary embodiment shown in FIG. 3, the description thereof will be omitted.

In S104, the radio base station 100 stores the measurement results included in the measurement result report message that is received in the measurement result statistical information database 105. In this exemplary embodiment, as is different from the first exemplary embodiment shown in FIG. 3, the radio base station 100 does not perform the transmission power control after receiving the measurement report message in S103, but performs the transmission power control at a predetermined timing as shown below.

Figure 8:
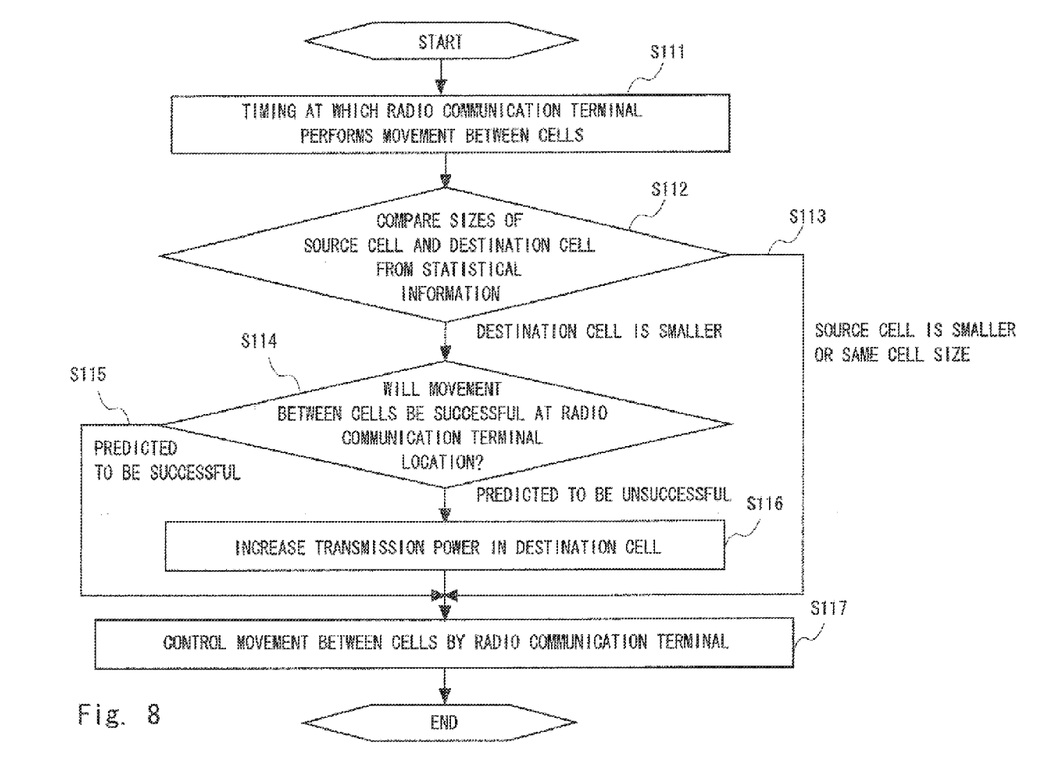
FIG. 8 is a flowchart showing an operation of the radio base station according to the third exemplary embodiment of the present invention.

FIG. 8 is a flowchart showing one example of an operation of the radio base station 100 according to this exemplary embodiment. Hereinafter, with reference to FIG. 8, an operation of the radio base station 100 according to this exemplary embodiment will be described.

The radio base station 100 performs processing of S112 and the following processing at the timing at which the radio communication terminal 200 performs movement between cells in S111. One example of the timing at which the movement between cells is performed is when CS Fallback is started and ended. Another example of the movement between cells is that the radio base station forming a plurality of cells that use different frequency bands (not limited to femto cells) moves the radio communication terminal from a cell with high communication load to a cell with low communication load for the purpose of distributing the load between cells. Further, when attributes of services to be provided are differentiated for each cell, the radio base station may perform movement between cells upon changes in the attributes of the services the radio communication terminal receives. For example, it includes a case in which the moving speed of the user changes when a cell for a user moving at a high speed is separated from a cell for a user moving at a low speed. Further, for example, also when a cell for a user who requires high communication data rate is separated from a cell for a user who requires constant communication data rate such as Streaming although the communication data rate may be low, the radio base station performs movement between cells of the radio communication terminal according to the change in the communication data rate of the service that is used.

In S112, the radio base station 100 refers to the statistical information of the measurement results stored in the measurement result statistical information database 105, to compare the sizes of the coverage areas between the source cell and the destination cell.

When the coverage areas of the cells are substantially equal or the source cell is smaller (S113) as a result of the comparison in S112, the radio base station 100 need not perform the transmission power control. Then, the radio base station 100 goes to processing of performing movement between cells (S117).

When the coverage area of the cell in the destination is larger than that in the source as a result of comparison in S112, the radio base station 100 determines in S114 whether the radio communication terminal 200 exists at a location at which the movement between cells is expected to be successful based on the positional information of the current location of the radio communication terminal 200 and the statistical information of the measurement result.

When it is predicted that the movement between cells is successful (S115) as a result of determination in S114, the radio base station 100 goes to processing of performing movement between cells (S117).

When it is predicted that the movement between cells is unsuccessful as a result of determination in S114, the radio base station 100 temporarily increases the transmission power in the destination cell to the level at which the movement between cells is expected to be successful (S116).

In S117, the radio base station 100 performs the movement between cells of the radio communication terminal 200.

While not illustrated in FIG. 8, the radio base station 100 may perform an operation of gradually decreasing the transmission power for every predetermined time interval after performing the movement between cells. This is because the transmission power that is temporarily increased in the destination cell may cause interference with the radio communication terminal 200 controlled by the radio base station 100 and neighbor radio base stations.

As described above, according to this exemplary embodiment, the transmission power control is performed only when the radio communication terminal moves between cells, so that it is possible to avoid constant interference with the radio communication terminal or neighbor radio base stations, and to increase the probability that the handover caused by the radio communication terminal moving between cells is successfully performed.

It is also possible to periodically perform the transmission power control shown in FIGS. 4 and 5 using the statistical information of the measurement results stored in S104. More specifically, the radio base station 100 calculates the average value in a predetermined period from the statistical information of the measurement result in the cell 110 and the measurement result in the cell 120 periodically, not at the timing at which the radio base station 100 receives the measurement results from the radio communication terminal 200 in S011. In S013, the radio base station 100 performs the transmission power control by comparing the average value that is calculated with the reference value.

As described above, according to this exemplary embodiment, the radio base station is able to perform transmission power control based not only on the instantaneous measurement results but also on the statistical measurement results, whereby it is possible to perform transmission power control with higher accuracy without being affected by the sudden changes in the radio communication environment.

While the present invention has been specifically described based on preferable exemplary embodiments, needless to say, the present invention is not limited to the description above, but may be variously changed without departing from the spirit of the present invention.

For example, in the exemplary embodiments stated above, the radio base station forming the two cells of the cell 110 and the cell 120 has been described as an example. However, the present invention may be applied to a radio base station that forms three or more cells.

Further, for example, while the cell 110 and the cell 120 use frequency bands different from each other in the above exemplary embodiments, the present invention may be applied to other cells as long as the cells are formed by one base station and the coverage areas are substantially matched geographically. For example, the present invention may be applied to cells that employ different wireless access systems: cells of WiFi (Wireless Fidelity), WiMAX (Worldwide Interoperability for Microwave Access), CDMA2000 (Code Division Multiple Access 2000), GSM (registered trademark) (Global System for Mobile Communications), in addition to LTE or 3G cell. The cells employing such different wireless access systems typically use different frequency bands in order to avoid interference. However, even if the same frequency band is used, the present invention can be applied if any measure to remove the interference is taken and the plurality of cells can coexist. For example, the present invention is also applicable to a case in which a plurality of cells are formed so as to allow a radio communication terminal to move from a cell with high communication load to a cell with low communication load for the purpose of distributing the load between cells, or a case in which different cells are used according to the service attributes (e.g., a case in which a cell for a user moving at a high speed is separated from a cell for a user moving at a low speed; a case in which a cell for a user who requires high communication data rate is separated from a cell for a user who requires constant communication data rate such as Streaming although the communication data rate may be low). Further, the frequency bands used for the cells are not necessarily fixed. The present invention may be applied to a radio communication system such as cognitive radio which appropriately changes the frequency bands to be used in a flexible manner. Further, the cell 110 and the cell 120 may be large cells (several hundred meters or larger in radius) like macro cells whose service is expanded over a wide area as a public wireless system, or may be small cells (several tens of meters or smaller in radius) like femto cells that are mainly installed indoors at home or offices, for example.

As another example, in the above exemplary embodiments, one radio base station 100 forms both cells of the cell 110 and the cell 120. However, the present invention can also be applied to such a case in which a plurality of radio base stations each form a cell as long as the cells are geographically close to each other, so that it is possible to appropriately control the coverage areas of the plurality of cells and to obtain the same effects as those in the exemplary embodiments stated above. In such a case, for example, the radio base station forming the cell 110 and the radio base station forming the cell 120 notify each other of the measurement results in each of the own radio base stations and the information regarding the transmission power control using an interface between the base stations, thereby being able to appropriately control the transmission power in both cells.

As another example, while the coverage areas of the cells are controlled by controlling the transmission power of the radio base station 100 in the exemplary embodiments stated above, the coverage areas may be controlled by controlling the beam tilt angle of the antenna of the radio base station 100.

As another example, in the third exemplary embodiment, as shown in FIG. 8, the transmission power in the destination cell is controlled to be increased when the destination cell is small and the movement between cells is predicted to be unsuccessful under the condition of the timing at which the radio communication terminal 200 moves between cells (S111, S112, S114, and S116). On the contrary, the transmission power control may be performed to decrease the coverage area of the source cell and to increase the coverage area of the destination cell under the condition that the radio communication terminal 200 fails in the movement between cells, i.e., the radio base station 100 detects the failure of the handover by the radio communication terminal 200. This is because the cause of the failure of the handover is that, since the coverage area of the destination cell is small, the radio communication terminal 100 cannot be connected to the destination cell and the radio communication terminal 100 returns to the source cell or re-connected to another cell. Further, the radio base station 100 may perform the transmission power control every time the failure of the handover is detected, or may count the number of failures of the handover and perform the transmission power control when the number exceeds a predetermined threshold.

According to the present invention, it is possible to provide a radio base station that controls coverage areas of a plurality of cells that use different frequency bands when one base station forms the plurality of cells. Accordingly, such an effect can be obtained that it is possible to increase the probability that a handover is successfully performed when the handover is performed by a radio communication terminal moving between cells.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The whole or part of the exemplary embodiments disclosed above can be described as, but not limited to, the following supplementary notes.

What is claimed is:

1. A radio base station, adapted to communicate with a radio communication terminal, comprising:
   a communication unit which performs a first communication with the radio communication terminal by using a first frequency,
   wherein the communication unit performs a second communication with the communication terminal by using a second frequency that is different from the first frequency; and
   a controller which performs a control, of at least one of a first power of the first communication and a second power of the second communication, based on a first power-related quality of the first communication and a second power-related quality of the second communication, wherein:
   the controller determines whether the first power-related quality is equal to or less than a first predetermined threshold and determines whether the second power-related quality is less than or equal to a second predetermined threshold;
   when the first power-related quality is equal to or less than the first predetermined threshold or the second power-related quality is equal to or less than a second predetermined threshold, the controller compares a first relative value, which is a difference between the first power-related quality and the first predetermined threshold, and a second relative value, which is a difference between the second power-related quality and the second predetermined quality;
   when the first relative value is larger than the second relative value, the controller performs control to lower the first power and raise the second power, thereby making the first power-related quality and the second power-related quality substantially equal; and
   when the first relative value is smaller than the second relative value, the controller performs control to raise the first power and lower the second power, thereby making the first power-related quality and the second power-related quality substantially equal.

2. The radio base station according to claim 1, wherein the first power-related quality and second power-related quality used in the controller comprise at least one of:
   RSRP (Reference Signal Received Power),
   RSRQ (Reference Signal Received Quality),
   Pathloss,
   Ec/No (The received energy per chip divided by the power density in the band), and
   RSCP (Received Signal Code Power).

3. The radio base station according to claim 1, wherein the first communication is used on an uplink carrier and the second communication is used on a downlink carrier.

4. A control method for a radio base station, adapted to communicate with a radio communication terminal, comprising:
   performing a first communication with the radio communication terminal by using a first frequency;
   performing a second communication with the communication terminal by using a second frequency that is different from the first frequency; and
   performing a control, of at least one of a first power of the first communication and a second power of the second communication, the performing the control comprising:
   determining whether a first power-related quality is equal to or less than a first predetermined threshold and determining whether a second power-related quality is less than or equal to a second predetermined threshold;
   when the first power-related quality is equal to or less than the first predetermined threshold or the second power-related quality is equal to or less than a second predetermined threshold, comparing a first relative value, which is a difference between the first power-related quality and the first predetermined threshold, and a second relative value, which is a difference between the second power-related quality and the second predetermined quality;
   when the first relative value is larger than the second relative value, lowering the first power and raising the second power, thereby making the first power-related quality and the second power-related quality substantially equal; and
   when the first relative value is smaller than the second relative value, raising the first power and lowering the second power, thereby making the first power-related quality and the second power-related quality substantially equal.

5. A non-transitory computer readable medium embodying instructions for controlling a device to implement a control method for a radio base station, adapted to communicate with a radio communication terminal, comprising:
   performing a first communication with the radio communication terminal by using a first frequency;
   performing a second communication with the communication terminal by using a second frequency that is different from the first frequency; and
   performing a control, of at least one of a first power of the first communication and a second power of the second communication, wherein the performing the control comprises:
   determining whether a first power-related quality is equal to or less than a first predetermined threshold and determining whether a second power-related quality is less than or equal to a second predetermined threshold;
   when the first power-related quality is equal to or less than the first predetermined threshold or the second power-related quality is equal to or less than a second predetermined threshold, comparing a first relative value, which is a difference between the first power-related quality and the first predetermined threshold, and a second relative value, which is a difference between the second power-related quality and the second predetermined quality;
   when the first relative value is larger than the second relative value, lowering the first power and raising the second power, thereby making the first power-related quality and the second power-related quality substantially equal; and
   when the first relative value is smaller than the second relative value, raising the first power and lowering the second power, thereby making the first power-related quality and the second power-related quality substantially equal.

6. A radio base station, adapted to communicate with a radio communication terminal, comprising:
   a communication unit which receives an first signal by using a first frequency,
   wherein the communication unit transmits an second signal by using a second frequency that is different from the first frequency; and
   a controller which performs a control, of at least one of a first power of the first signal and a second power of the second signal, based on a first power-related quality of the first signal and a second power-related quality of the second signal, wherein:

the controller determines whether the first power-related quality is equal to or less than a first predetermined threshold and determines whether the second power-related quality is less than or equal to a second predetermined threshold;

when the first power-related quality is equal to or less than the first predetermined threshold or the second power-related quality is equal to or less than a second predetermined threshold, the controller compares a first relative value, which is a difference between the first power-related quality and the first predetermined threshold, and a second relative value, which is a difference between the second power-related quality and the second predetermined quality;

when the first relative value is larger than the second relative value, the controller performs control to lower the first power and raise the second power, thereby making the first power-related quality and the second power-related quality substantially equal; and when the first relative value is smaller than the second relative value, the controller performs control to raise the first power and lower the second power, thereby making the first power-related quality and the second power-related quality substantially equal.

7. A radio base station, adapted to communicate with a radio communication terminal, comprising:

a communication unit which performs a first communication with the radio communication terminal, wherein the communication unit performs a second communication with the communication terminal; and a controller which performs a control, of at least one of a first power of the first communication and a second power of the second communication, based on a first power-related quality of the first communication and a second power-related quality of the second communication, wherein:

the controller determines whether the first power-related quality is equal to or less than a first predetermined threshold and determines whether the second power-related quality is less than or equal to a second predetermined threshold;

when the first power-related quality is equal to or less than the first predetermined threshold or the second power-related quality is equal to or less than a second predetermined threshold, the controller compares a first relative value, which is a difference between the first power-related quality and the first predetermined threshold, and a second relative value, which is a difference between the second power-related quality and the second predetermined quality;

when the first relative value is larger than the second relative value, the controller performs control to lower the first power and raise the second power, thereby making the first power-related quality and the second power-related quality substantially equal; and when the first relative value is smaller than the second relative value, the controller performs control to raise the first power and lower the second power, thereby making the first power-related quality and the second power-related quality substantially equal.

* * * * *